(12) United States Patent
Lin

(10) Patent No.: US 7,412,744 B2
(45) Date of Patent: Aug. 19, 2008

(54) WIPER FOR AN AUTOMOBILE REAR-VIEW MIRROR

(76) Inventor: Chiang-Fen Lin, P.O. Box 90, Tainan City 70499 (TW)

(*) Notice: Subject to any disclaimer, the term of this patent is extended or adjusted under 35 U.S.C. 154(b) by 6 days.

(21) Appl. No.: 11/514,857

(22) Filed: Sep. 5, 2006

(65) Prior Publication Data

US 2008/0052861 A1   Mar. 6, 2008

(51) Int. Cl.
*B60S 1/56* (2006.01)
*B60S 1/60* (2006.01)
*B60S 1/26* (2006.01)

(52) U.S. Cl. ............. 15/250.003; 15/250.3; 15/250.43; 15/250.351; 15/250.48

(58) Field of Classification Search ............ 15/250.003, 15/250.002, 250.3, 250.43, 250.351, 250.48, 15/250.23, 250.21
See application file for complete search history.

(56) References Cited

U.S. PATENT DOCUMENTS 2,944,277 A * 7/1960 Ochello .................... 15/250.3
3,447,187 A * 6/1969 Barrett ..................... 15/250.16
4,435,875 A * 3/1984 Hauk ....................... 15/250.23
4,466,712 A * 8/1984 Vitaloni .................... 359/507

FOREIGN PATENT DOCUMENTS

| FR | 2617781 | * | 1/1989 |
| JP | 57-95239 | * | 6/1982 |
| JP | 57-209448 | * | 12/1982 |

* cited by examiner

*Primary Examiner*—Gary K Graham

(57) ABSTRACT

A wiper for an automobile rear-view mirror includes a wiper transmission device disposed at the rear side of a mirror base, a connecting rod and a wiper. The wiper transmission device has a transmission motor provided with a drive gear engaged with a driven gear coupled with a worm that is engaged with a worm gear. The worm gear is connected with a driven worm by a support shaft, and the driven worm is engaged with a driven worm gear secured on a rotating shaft, which has its outer end inserted out of the rearview mirror and fixed with a connecting rod having a wiper fixed thereon. When the wiper transmission device is started, the wiper can sway upward and downward for wiping water drops off the surface of the rear-view mirror to keep it clear, enabling a driver to clearly watch the traffic conditions and drive safely.

1 Claim, 7 Drawing Sheets

WIPER FOR AN AUTOMOBILE REAR-VIEW MIRROR

BACKGROUND OF THE INVENTION

1. Field of the Invention

This invention relates to a wiper for an automobile rear-view mirror, particularly to one able to wipe out water drops on the surface of a rear-view mirror of an automobile to enable a driver to clearly watch the traffic conditions reflected in the rear-view mirror and drive with safety.

2. Description of the Prior Art

As commonly known, it is of great importance for a driver to watch the moving conditions of the automobiles coming from behind through the left and the right rear-view mirror before making a turn, overtaking a car, changing lanes or parking. However, the rear-view mirrors of an automobile are respectively positioned at its opposite outer sides; therefore, in raining days, rain water will remain on the surfaces of the rear-view mirrors and make the rear-view mirrors fail to reflect images clearly. As a result, the driver of an automobile cannot clearly watch the moving conditions of the automobiles coming from behind, thus rendering a driver unable to drive with safety.

SUMMARY OF THE INVENTION

The objective of the invention is to offer a wiper for an automobile rear-view mirror, able to wipe out water drops on the rear-view mirror to enable a driver to clearly watch the traffic conditions reflected in the rear-view mirror and drive with safety.

The wiper for an automobile rear-view mirror in the present invention includes a mirror base, a wiper transmission device, a connecting rod and a wiper. The mirror base has its front side fixed with a mirror body. The transmission device is disposed at the rear side of the mirror base and provided with a transmission motor having a driving gear extending upward. The driving gear of the transmission motor is engaged with a driven gear, which is coupled with a worm engaged with a worm gear. The worm gear is connected with a driven worm by an elongate support shaft, and the driven worm is engaged with a driven worm gear that is secured on a rotating shaft. The rotating shaft has its outer end inserted out of one corner of the mirror base and the mirror body. The connecting rod is fixed at the outer end of the rotating shaft and the wiper is fitted on the connecting rod.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
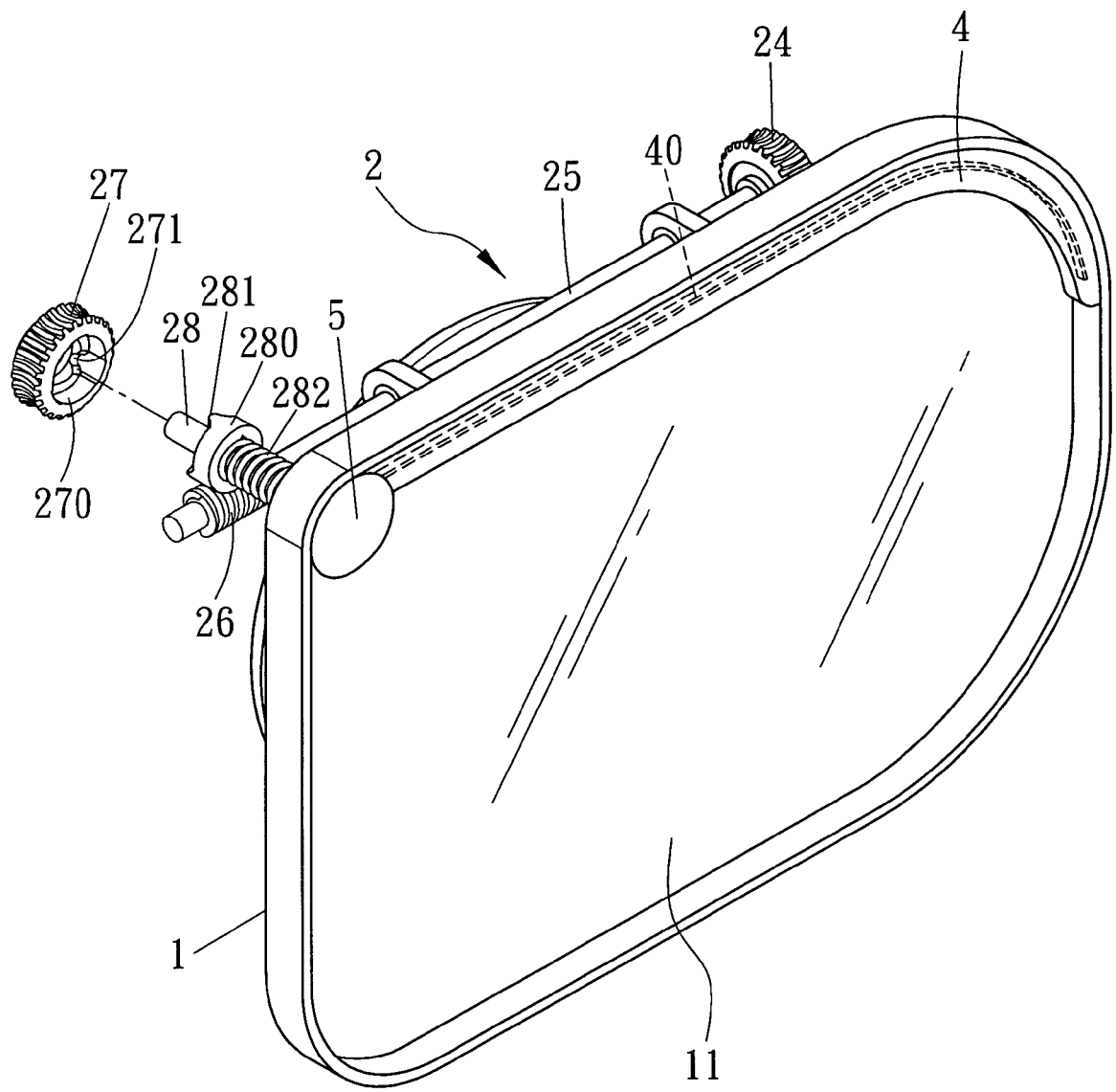
FIG. 1 is a perspective view of a mirror base in the present invention.
Figure 2:
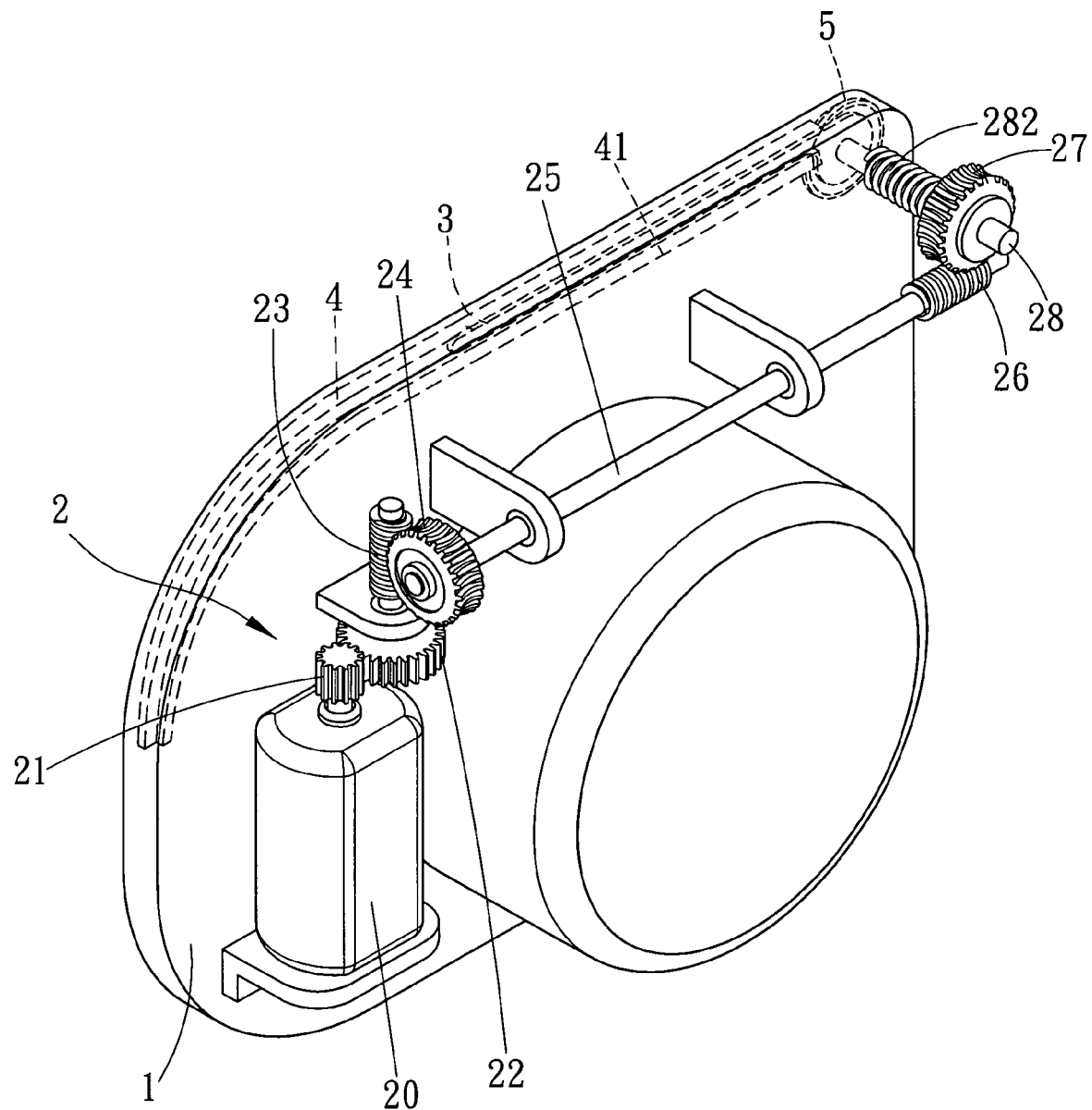
FIG. 2 is a perspective view of the rear side of a mirror base in the present invention.
Figure 3:
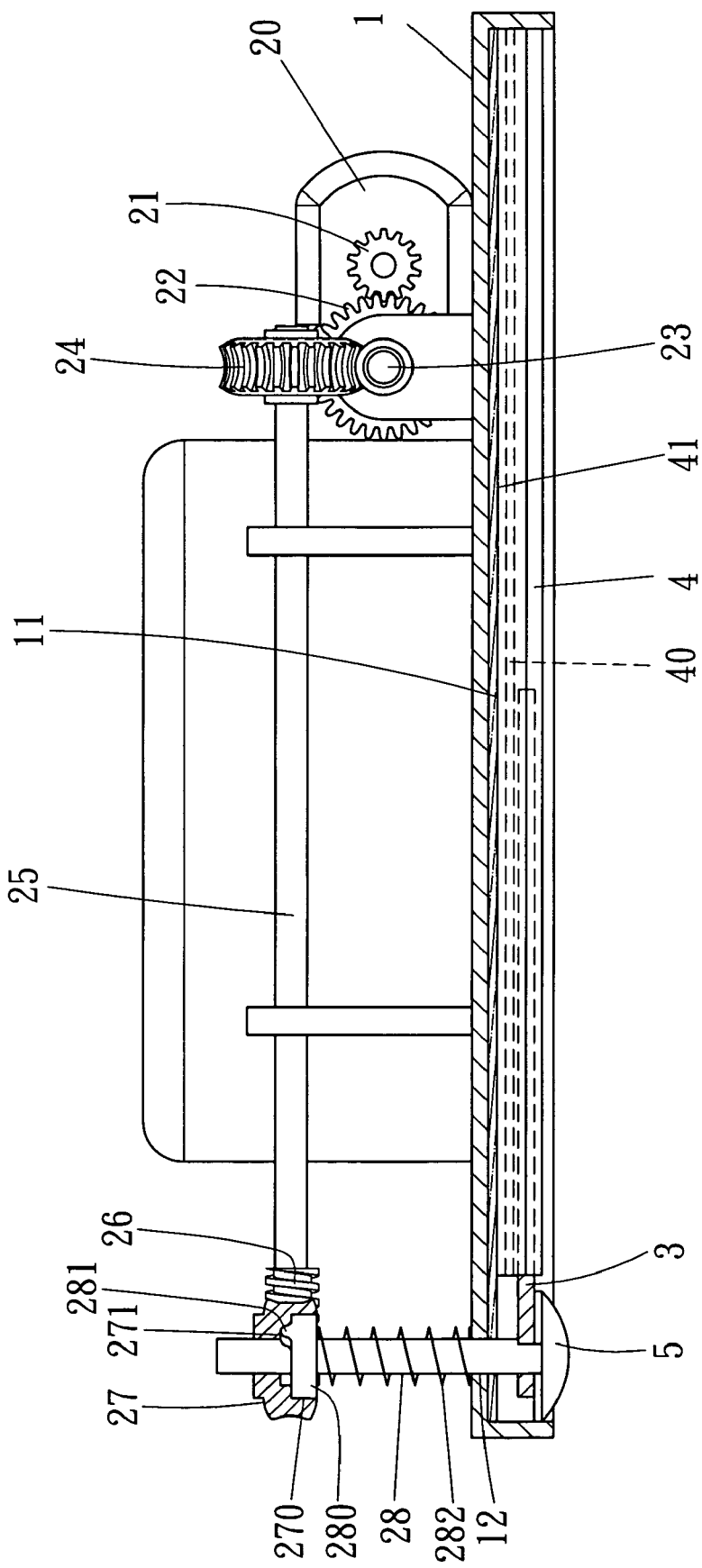
FIG. 3 is an upper cross-sectional view of a wiper for an automobile rear-view mirror in the present invention.

A preferred embodiment of a wiper for automobile rear-view mirror in the present invention, as shown in FIGS. 1, 2 and 3, includes a mirror base 1, a wiper transmission device 2, a connecting rod 3, a wiper 4 and a position member 5 as main components combined together.

The mirror base 1 has its front side provided with a mirror body 11 and has one corner of the mirror base 1 and the mirror body 11 bored with an insert hole 12.

The wiper transmission device 2 is disposed at the rear side of the mirror base 1 and provided with a transmission motor 20 with a drive gear 21 extending outer and engaged with a driven gear 22 that is coupled with a worm 23 engaged with a worm gear 24. The worm gear 24 is connected with a driven worm 26 by an elongate support shaft 25 for rotating together, and the driven worm 26 is engaged with a driven worm gear 27 that is secured on a rotating shaft 28. The driven worm gear 27 is formed in the interior with a recessed chamber 270 having its inner wall bored with plural engage grooves 271, and the rotating shaft 28 is fixed thereon with a projecting block 280 to be received in the recessed chamber 270 of the driven worm gear 27. The projecting block 280 of the rotating shaft 28 has its outer wall formed with a plurality of engage members 281 to be respectively engaged in the engage members 281 to be respectively engaged in the engage grooves 271 of the driven worm gear 27. The rotating shaft 28 is fitted thereon with an elastic member 282 having one end pushing against the rear side of the mirror base 1 and the other end resisting against the outer side of the projecting block 280 of the rotating shaft 28. Further, the rotating shaft 28 has its outer end inserted through the insert holes 12 of the mirror base 1 and the mirror surface 11.

The connecting rod 3 has a first end fixed with the outer end of the rotating shaft 28 and positioned at the front side of the mirror body 11.

The wiper 4 made of soft material is fitted on the connecting rod 3 and provided with an elastic strip 40 in the interior so that when the wiper 4 is driven to sway, the outer end of the wiper 4 will push against the edge of the mirror base 1 and become elastically curved. The wiper 4 has its wiping surface 41 contacting closely with the surface of the mirror body 11 of the mirror base 1.

The positioning member 5 is fixed with the outer end of the rotating shaft 28 and positioned at one side of the connecting rod 3 for securing the first end of the connecting rod 3 on the rotating shaft 28.

Figure 5:
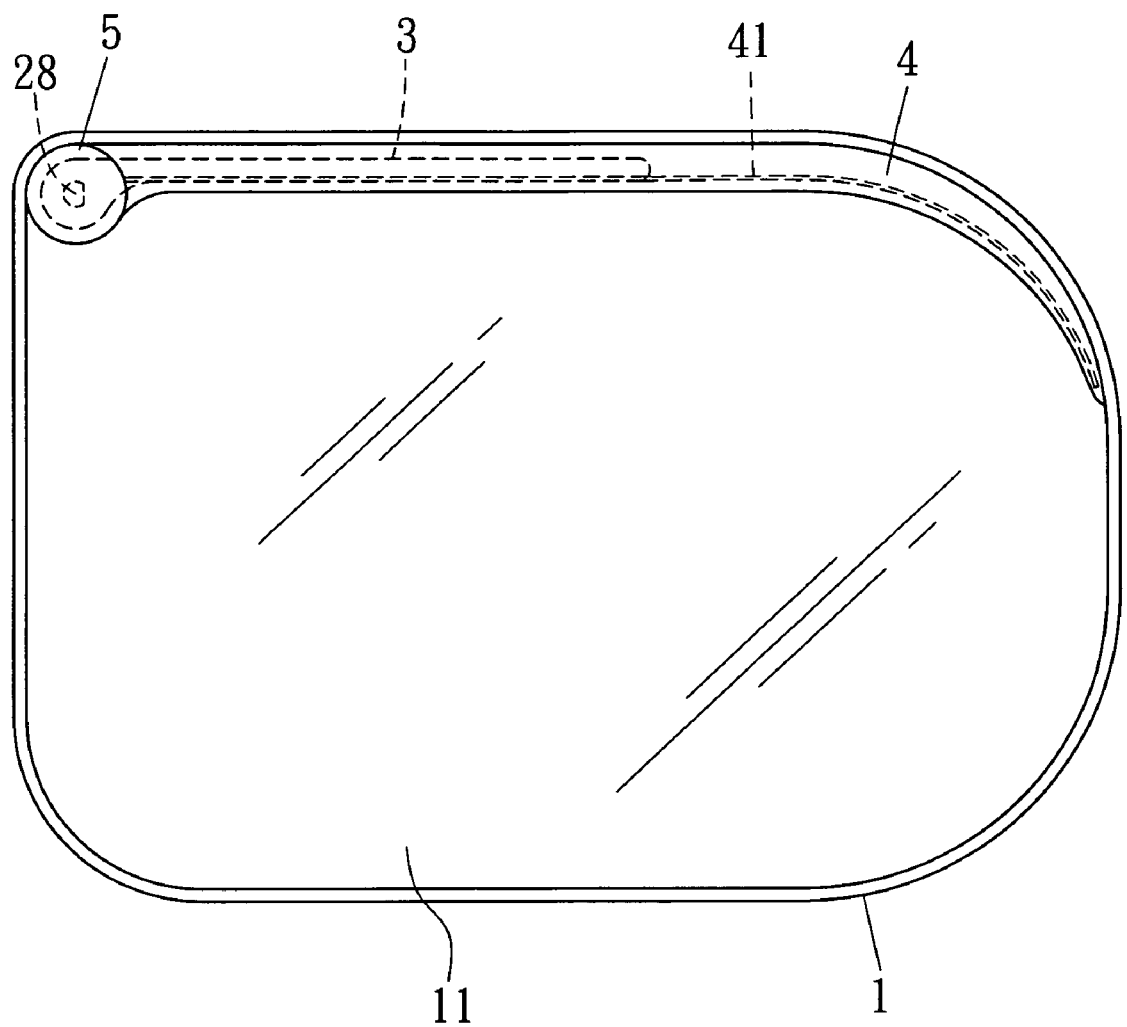
FIG. 5 is a front view of the wiper for an automobile rear-view mirror in a first moving condition in the present invention.
Figure 6:
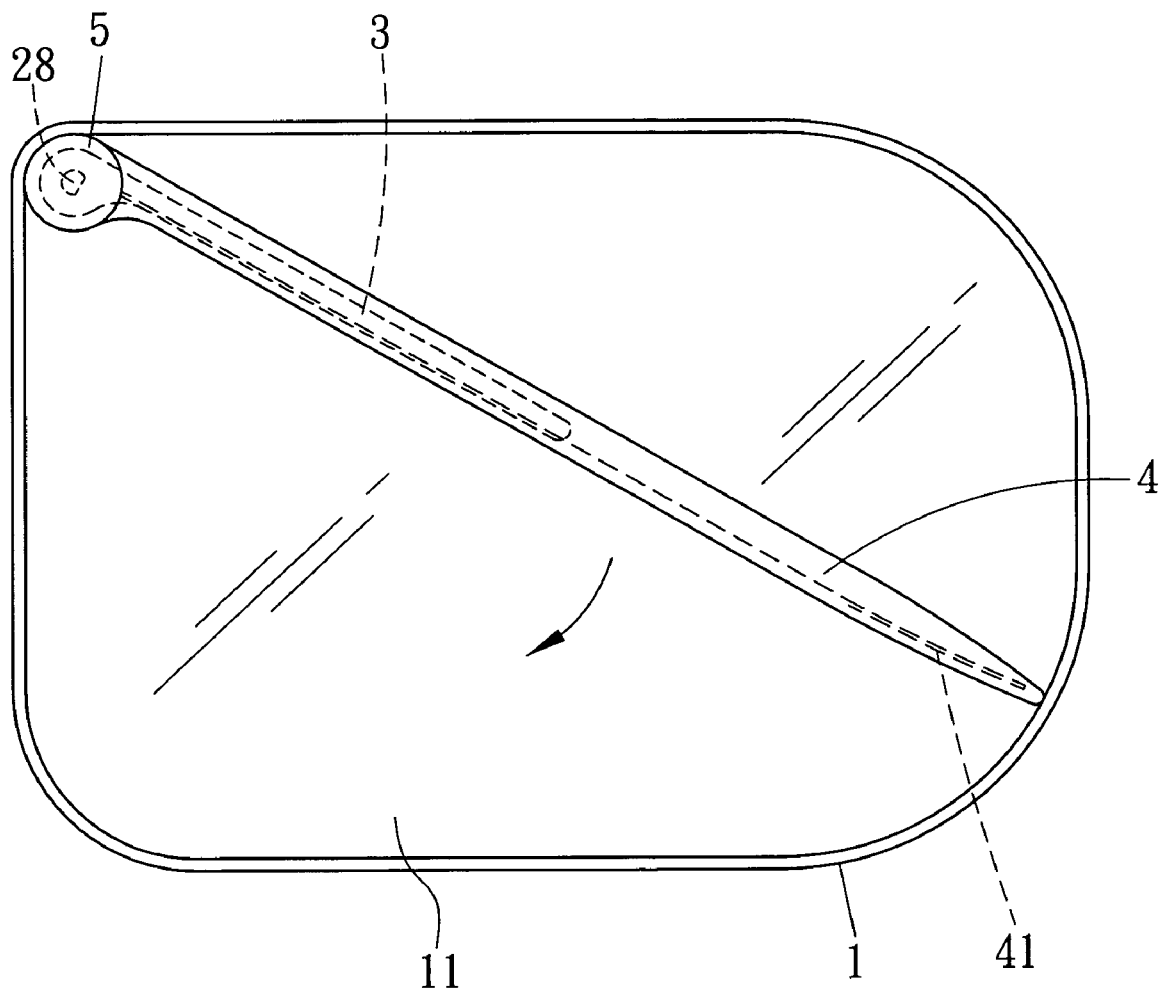
FIG. 6 is another front view of the wiper for an automobile rear-view mirror in a second moving condition in the present invention.
Figure 7:
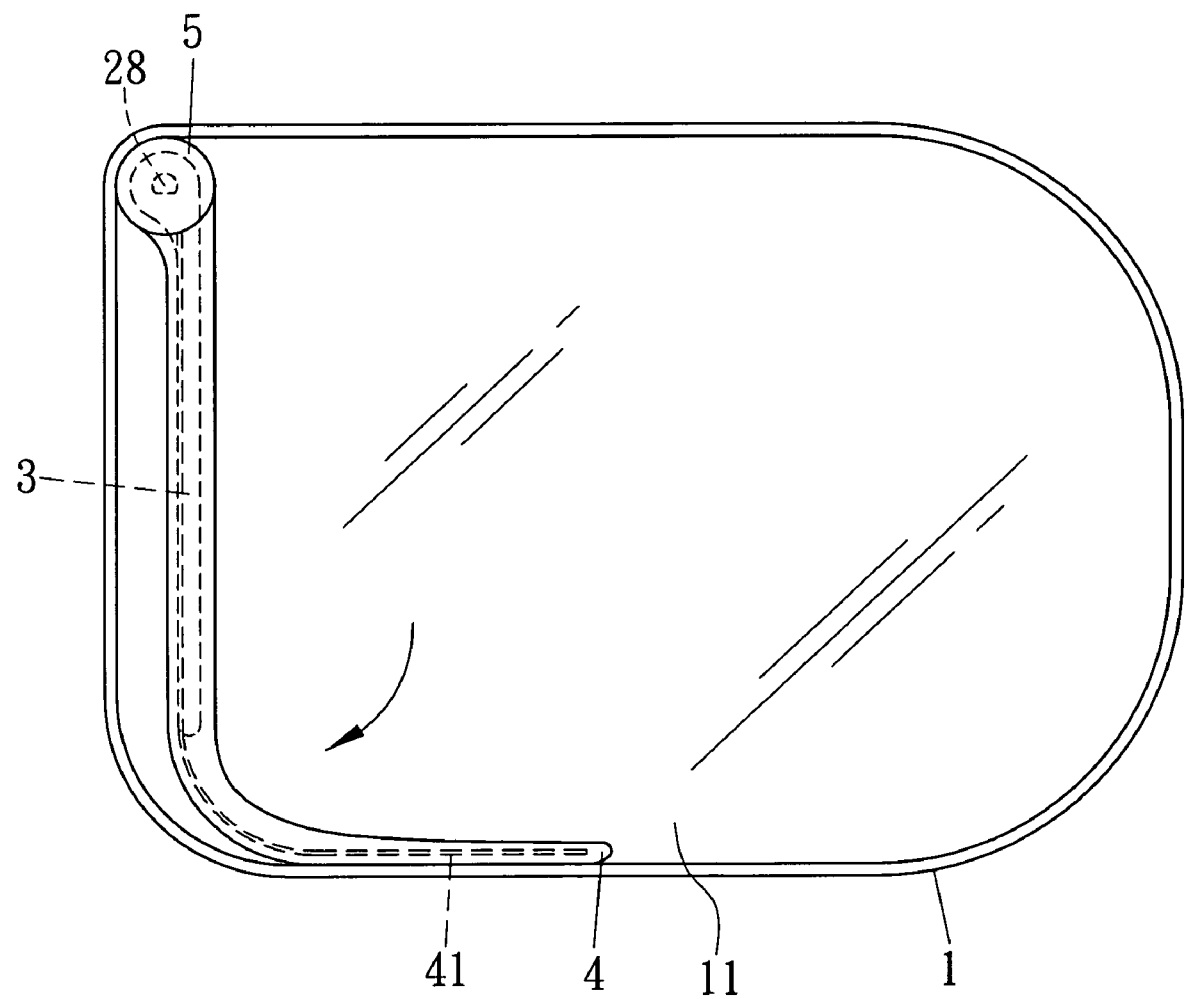
FIG. 7 is a third front view of the wiper for an automobile rear-view mirror in a third moving condition in the present invention.

To wipe out the rain water on the mirror body 11 of the rear-view mirror, as shown in FIGS. 5, 6 and 7, only start the transmission motor 20 of the wiper transmission device 2 to operate to let the drive gear 21 rotate the driven gear 22 and actuate both the worm 23 at one side of the driven gear 22 and the worm gear 24 engaged with the worm 23 to rotate together. Simultaneously, the worm gear 24 will actuate the support shaft 25 and then the driven worm 26 at one end of the support shaft 25 to rotate together, and the driven worm 26 will drive the driven worm gear 27 together with the rotating shaft 28 to rotate together. Meanwhile the rotating shaft 28 will drive the connecting rod 3 and the wiper 4 to sway upward and downward. A this time, the wiper 4, with the rotating shaft 28 acting as a pivot, will be swayed arctuately on the mirror body 11. When the wiper 4 is driven to sway and touch the lower edge of the mirror base 1, the wiper 4, which is made of soft material and provided with the elastic strip 40 in the interior, will have its outer end pressed bent along the inner edge of the mirror body 11 of the mirror base 1 and the elastic strip 40 together with the wiper 4 will be in an elastically curved condition, as shown in FIG. 7. When the wiper 4 is swayed to push against the lower edge of the mirror surface 11 of the mirror base 1, the transmission motor 20 will operate reversely to drive the rotating shaft 28 to rotate reversely and actuate the wiper 4 to sway upward. When the wiper 4 sways upward, the elastic strip 40 inside the wiper 4 is no longer pressed by the edge of the mirror base 1 and will elastically recover its original straight shape for wiping the water drops off the mirror body 11, as shown in FIG. 6. Then, when the wiper 4 is swayed upward to a horizontal position (to the upper edge of the mirror base 1), the transmission motor 20 will again operate reversely to drive the wiper 4 to sway downward for wiping out water drops on the mirror body 11. By so designing, the wiper 4 can be driven by the wiper transmission device 2 to sway up and down on the mirror body 11, and the wiping surface 41 of the wiper 4 can function to clean up water drops on the mirror body 11 to keep the mirror body 11 clear and enable a driver to clearly watch the traffic conditions reflected in the rear-view mirror and drive safely.

Figure 4:
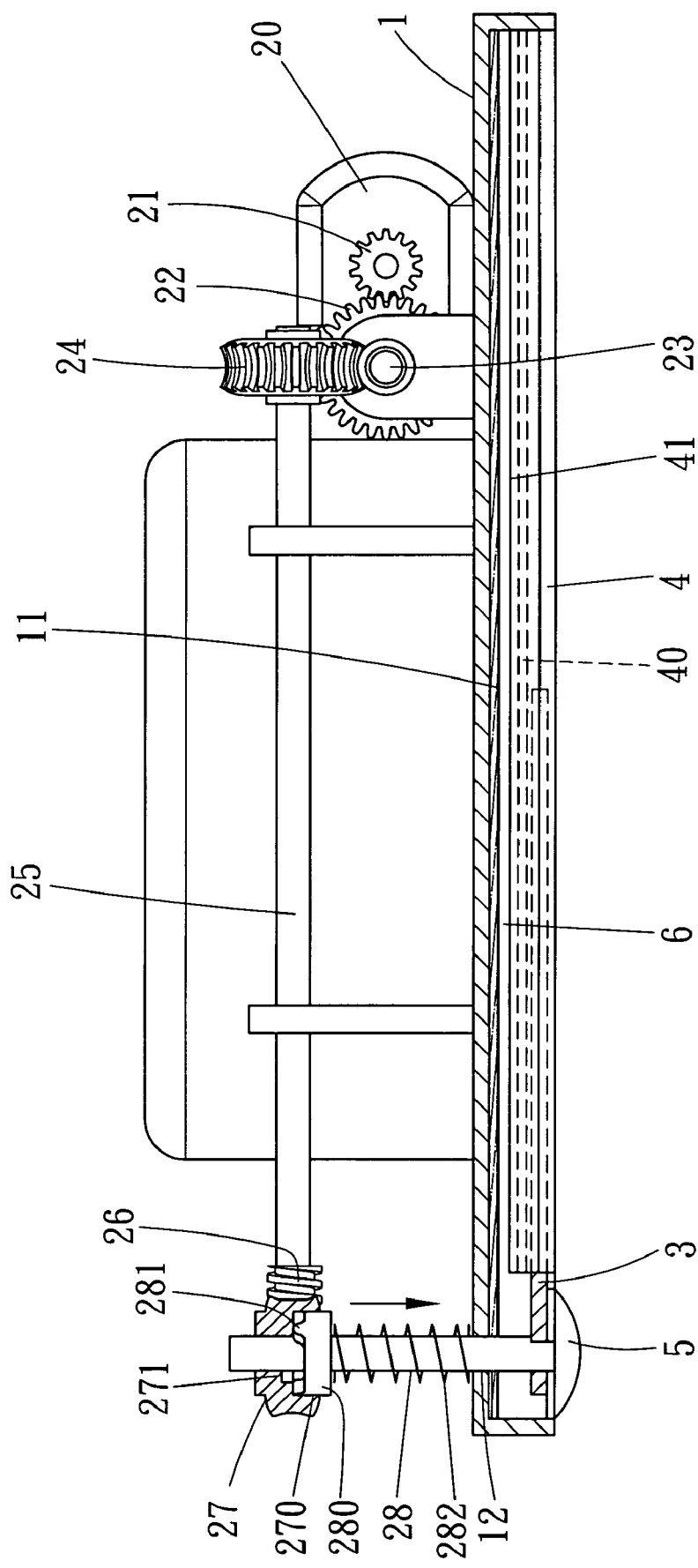
FIG. 4 is an upper cross-sectional view of the wiper for an automobile rear-view mirror in the present invention, showing a gap formed between the wiper and the mirror surface.

When the wiper 4 is not in use, the wiper 4 will be actuated to move to the upper edge of the mirror base 1 by the transmission motor 20, as shown in FIGS. 3, 4 and 5. At this time, the driven worm gear 27 on the rotating shaft 28 will be slightly driven to rotate by the driven worm 26, and the rotating shaft 28 restricted by the wiper 4 resisting against the upper edge of the mirror face base 1 will be unable to rotate any more. When the driven worm gear 27 is rotated, the engage members 281 on the rotating shaft 28 will disengage from the engage grooves 271 in the recessed chamber 270 of the driven worm gear 27 to resist against the inner wall of the recessed chamber 270 and push the rotating shaft 28 to move forward and compress the elastic member 282, as shown in FIG. 4. Simultaneously, the rotating shaft 28 will actuate the connecting rod 3 and the wiper 4 to move forward, letting the wiper 4 move away from the mirror body 11 of the mirror face base 1 to form a gap 6 between the wiper 4 and the mirror body 11, thus able to prevent the wiper 4 from producing gluing due to long-term contacting with the mirror body 11.

In addition, under hot sunlight, the wiper 4 is likely to become softened, and the grease produced by the softened wiper 4 may permeate into the pores of the mirror body 11 and make the mirror body 11 unclear; therefore, when the wiper 4 is not in use and if the gap 6 is formed between the wiper 4 and the mirror body 11 as mentioned above, the grease of the wiper 4 can be prevented from permeating into the pores of the mirror surface 11, thus able to always keep the mirror body 11 clear and prolong the service life of the wiper 4.

When the wiper 4 is to be used again, the transmission motor 20 is started to actuate the wiper transmission device 2 to operate and drive the driven worm gear 27 to rotate, letting the engage grooves 271 of the driven worm gear 27 aligned to the engage members 281 of the rotating shaft 28. At this time, the elastic member 282 on the rotating shaft 28 will recover its elastic force and push the rotating shaft 28 to move backward to its original position and have its engage members 281 respectively engaged and positioned in the engage grooves 271 of the driven worm gear 27, and the wiping surface 41 of the wiper 4 will again contact closely with the mirror body 11. Then, in the same transmission way as described above, the wiper 4 can be driven to sway back and forth on the mirror body 11 for wiping out the water drops on the mirror body 11, easy in handling and convenient in use.

While the preferred embodiment of the invention has been described above, it will be recognized and understood that various modifications may be made therein and the appended claims are intended to cover all such modifications that may fall within the spirit and scope of the invention.

What is claimed is:

1. A wiper for automobile rear-view mirror, comprising a mirror base, a wiper transmission device, a connecting rod, a wiper and a position member; wherein:

the mirror base has a front side provided with a mirror body which is bored with an insert hole;

the wiper transmission device is disposed at a rear side of the mirror base and is provided with a transmission motor with a drive gear extending and engaged with a driven gear which is coupled with a worm engaged with a worm gear; the worm gear is connected with a driven worm by an elongate support shaft for rotating together, and the driven worm is engaged with a driven worm gear which is secured on a rotating shaft; the driven worm gear is formed in an interior with a recessed chamber having its inner wall bored with plural engage grooves, and the rotating shaft is fixed thereon with a projecting block to be received in the recessed chamber of the driven worm gear; the projecting block of the rotating shaft has an outer wall formed with a plurality of engage members to be respectively engaged in the engage members to be respectively engaged in the engage grooves of the driven worm gear; the rotating shaft is fitted thereon with an elastic member having one end pushing against the rear side of the mirror base and another end thereof resisting against an outer side of the projecting block of the rotating shaft; further, the rotating shaft has an outer end inserted through the insert holes of the mirror base and the mirror surface;

the connecting rod has a first end fixed to an outer end of the rotating shaft and positioned at the front side of the mirror body;

the wiper made of soft material is fitted on the connecting rod and provided with an elastic strip in the interior so that when the wiper is driven to sway, the outer end of the wiper will push against the edge of the mirror base and become elastically curved; the wiper has its wiping surface contacting closely with a surface of the mirror body of the mirror base; and the positioning member is fixed with the outer end of the rotating shaft and positioned at one side of the connecting rod for securing the first end of the connecting rod on the rotating shaft.

* * * * *